US011068969B2

(12) United States Patent
Wilson et al.

(10) Patent No.: US 11,068,969 B2
(45) Date of Patent: Jul. 20, 2021

(54) METHOD AND SYSTEM FOR CONFIGURING A VIRTUAL REALITY ENVIRONMENT

(71) Applicant: International Business Machines Corporation, Armonk, NY (US)

(72) Inventors: John D. Wilson, League City, TX (US); Shikhar Kwatra, Durham, NC (US); Paul Krystek, Highland, NY (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/287,212

(22) Filed: Feb. 27, 2019

(65) Prior Publication Data
US 2020/0273092 A1 Aug. 27, 2020

(51) Int. Cl.
*G06Q 30/06* (2012.01)
*G06Q 30/02* (2012.01)
*G06T 19/00* (2011.01)
*G06F 16/44* (2019.01)
*G06F 16/435* (2019.01)

(52) U.S. Cl.
CPC ....... *G06Q 30/0643* (2013.01); *G06F 16/444* (2019.01); *G06Q 30/0269* (2013.01); *G06Q 30/0277* (2013.01); *G06T 19/003* (2013.01); *G06F 16/436* (2019.01)

(58) Field of Classification Search
CPC .......... G06Q 30/0269; G06Q 30/0277; G06Q 30/0643; G06F 16/436; G06F 16/444; G06F 3/015
See application file for complete search history.

(56) References Cited

U.S. PATENT DOCUMENTS

| 6,380,952 | B1 | 4/2002 | Mass et al. |
| 8,527,430 | B2 | 9/2013 | Hamilton, II et al. |
| 9,539,498 | B1* | 1/2017 | Hanke .................. A63F 13/217 |
| 2005/0086612 | A1* | 4/2005 | Gettman ............... G06Q 30/02 715/848 |
| 2007/0179867 | A1* | 8/2007 | Glazer .............. G06Q 30/0603 705/26.43 |

(Continued)

FOREIGN PATENT DOCUMENTS

WO 2015168167 A1 11/2015

OTHER PUBLICATIONS

Pullar-Strecker, T. (Jul. 14, 2016). VR you can walk around in. Waikato Times Retrieved from https://dialog.proquest.com/professional/docview/1803563869?accountid=131444.*

(Continued)

*Primary Examiner* — Resha Desai
(74) *Attorney, Agent, or Firm* — Jamar K. Ray

(57) ABSTRACT

A method for creating a customized virtual shopping experience may include receiving physical-world shopping data of a first user. The physical-world shopping data may be collected while the first user is physically present in a physical-world shopping environment. The method may also include configuring a virtual shopping environment based at least in part on the physical-world shopping data of the first user, and displaying to the first user the virtual shopping environment.

9 Claims, 6 Drawing Sheets

(56) References Cited

U.S. PATENT DOCUMENTS

| | | | |
|---|---|---|---|
| 2009/0037291 A1* | 2/2009 | Dawson | G06Q 30/0603 |
| | | | 705/27.2 |
| 2009/0217171 A1 | 8/2009 | Hamilton, II et al. | |
| 2009/0300521 A1 | 12/2009 | Jerrard-Dunne et al. | |
| 2010/0060648 A1 | 3/2010 | Carter et al. | |
| 2010/0161906 A1 | 6/2010 | Bolger et al. | |
| 2010/0241525 A1* | 9/2010 | Aguera y Arcas | |
| | | | G06Q 30/0601 |
| | | | 705/26.1 |
| 2015/0170228 A1* | 6/2015 | Wheeler | G06Q 50/01 |
| | | | 705/319 |
| 2016/0077547 A1* | 3/2016 | Aimone | A61B 5/0006 |
| | | | 345/8 |
| 2016/0253840 A1 | 9/2016 | Lee | |
| 2017/0278306 A1* | 9/2017 | Rico | G06F 3/04815 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

METHOD AND SYSTEM FOR CONFIGURING A VIRTUAL REALITY ENVIRONMENT

BACKGROUND

The present disclosure relates to virtual reality environments, and more specifically, to configuring and navigating virtual reality shopping environments.

Navigating and locating products in a virtual shopping environment may present challenges to a user. Tools may be provided to address such challenges.

SUMMARY

Some embodiments of the present disclosure can be illustrated as a method for configuring a customized virtual reality environment. The method may comprise receiving first-user shopping data of a first user. The method may further comprise configuring a virtual shopping environment. The method may further comprise determining a navigation path through the virtual shopping environment based on the first-user shopping data. The method may further comprise displaying to the first user the virtual shopping environment. The displaying may comprise automatically advancing the first user along the navigation path.

Some embodiments of the present disclosure can be illustrated as a method for configuring a customized virtual reality environment. The method may comprise receiving physical-world shopping data of a first user. The physical-world shopping data may be collected while the first user is physically present in a physical-world shopping environment. The method may further comprise configuring a virtual shopping environment based at least in part on the physical-world shopping data of the first user. The method may further comprise displaying to the first user the virtual shopping environment.

Some embodiments of the present disclosure can be illustrated as a computer program product for configuring a customized virtual reality environment. The computer program product may comprise a computer readable storage medium having program instructions embodied therewith. The program instructions may be executable by a computer to cause the computer to receive physical-world shopping data of a first user. The physical-world shopping data may be collected while the first user is physically present in a physical-world shopping environment. The program instructions may further cause the computer to configure a virtual shopping environment based at least in part on the physical-world shopping data of the first user. The program instructions may further cause the computer to display to the first user the virtual shopping environment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
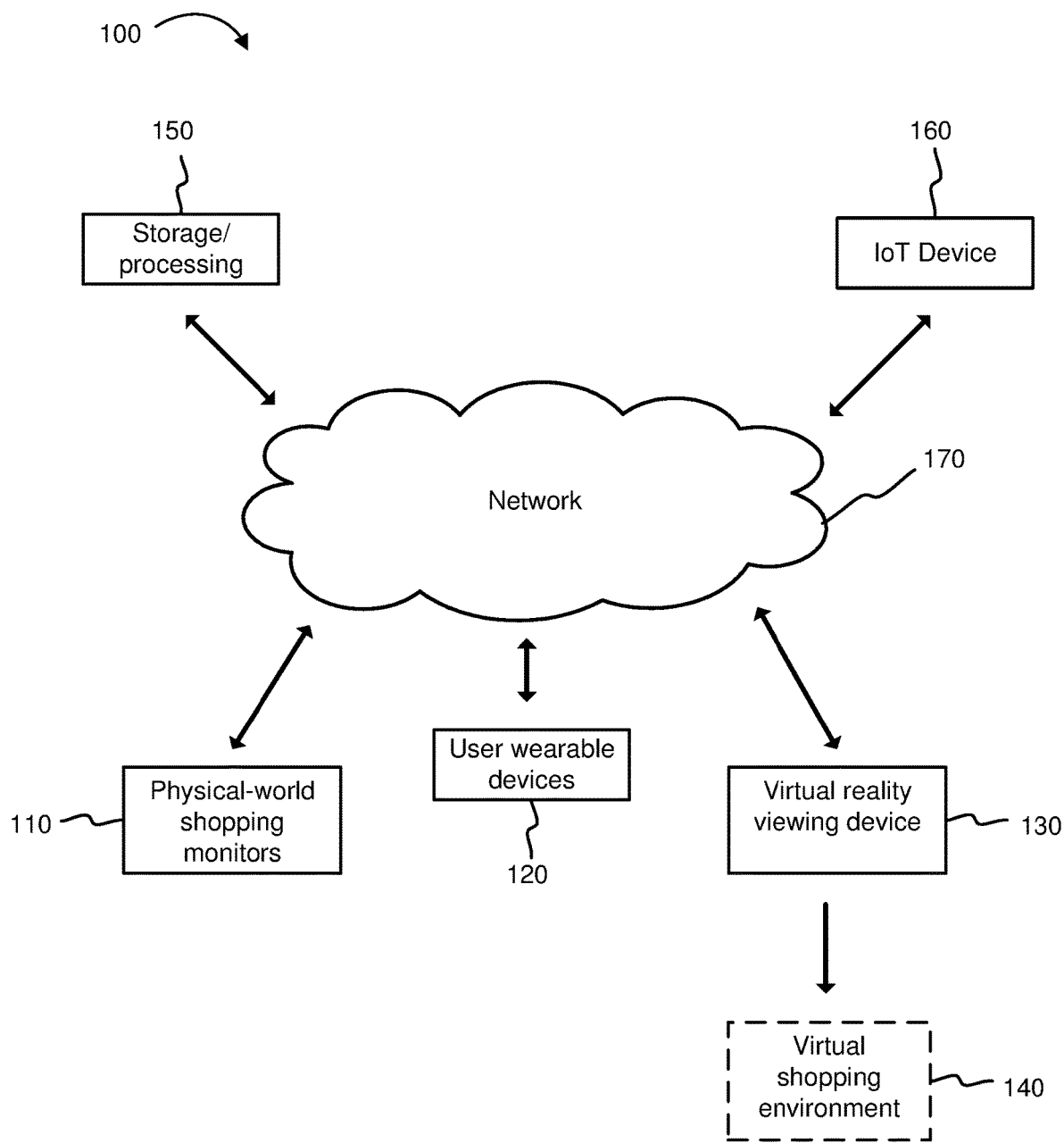
FIG. 1 depicts an example system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to virtual reality applications; more particular aspects relate to virtual reality shopping applications. While the present disclosure is not necessarily limited to such applications, various aspects of the disclosure may be appreciated through a discussion of various examples using this context.

Virtual reality systems allow users to participate in a virtual-world environment, such as a digital rendition of an actual, physical-world environment. One such environment may be a virtual shopping environment that provides an array of products available to a user for purchase. Navigating a virtual shopping environment may present challenges, such as efficiently locating and conveniently browsing products of interest. Thus, users may find it difficult to shop in a virtual shopping environment in the same way they would shop in a physical-world environment.

To address these and other problems, embodiments of the present disclosure include a method and system for creating a customized virtual shopping experience that may be based on a user's shopping activity during a physical-world shopping experience.

Embodiments of the present disclosure may customize a user's virtual shopping experience by collecting and analyzing data from the user's physical-world shopping activity as well as from the user's virtual-world shopping activity and thereby configuring and displaying a virtual shopping environment for user navigation.

For example, a user may typically shop at physical-world store (i.e., a physical brick-and-mortar store, where the user may be physically present to shop for products), such as local grocery store A. The user may be interested in exploring grocery store B via a virtual shopping experience (i.e., by participating in a virtual reality rendition of grocery store B using a virtual reality viewing device, such as virtual reality goggles). In this example, the layout and available products of grocery store B may be unfamiliar to the user. A system of the present disclosure may receive physical-world shopping data corresponding to the user's shopping activity in local grocery store A. The physical-world shopping data (i.e., data collected while the user shops while physically present in a physical-world shopping environment), may include an average physical-world navigation pace (i.e., the user's walking speed through the physical-world shopping environment) and a physical-world navigation routine (e.g., the user may typically begin shopping in a cleaning supplies department, followed by a laundry department, produce department, and then a dairy department). Based on the physical-world shopping data, a system of the present disclosure may configure a virtual-world navigation pace and a virtual-world navigation path through the virtual shopping environment of grocery store B that mimics the user's shopping activity in physical-world grocery store A (e.g., a default virtual-world navigation pace may be configured to match the user's average physical-world navigation pace, and a virtual-world navigation path may be configured to begin in the cleaning supplies department and mimic the user's usual physical-world navigation routine).

By customizing a user's virtual shopping environment based on the user's physical-world shopping data, embodiments of the present disclosure may allow a user to shop in an unfamiliar virtual shopping environment in the same way the user typically shops in a familiar physical-world shopping environment. As a result, embodiments of the present disclosure may provide an efficient presentation of a virtual shopping environment as well as a convenient virtual shopping experience for a user.

Some embodiments of the present disclosure may customize a user's virtual shopping environment based on data collected from a user's previous virtual shopping experiences (e.g. a user's verbal expressions during a previous virtual shopping experience may affect which products appear in a subsequent virtual shopping experience). In some embodiments, public shopping data (i.e., available shopping data that corresponds to shopping activity of the shopping public) may determine parameters of a virtual shopping experience. For example, in some embodiments, a virtual shopping environment may be configured to more prominently display items rated highly by the general public so that a user may virtually browse all available items, but readily distinguish highly rated items. In some embodiments, "Internet of Things" ("IoT") device data may influence a virtual shopping environment display. For example, in some embodiments a user participating in a virtual shopping environment may view images from an IoT camera installed inside the user's refrigerator to determine whether particular groceries were needed. In some embodiments, a user's selected preferences (e.g., a chosen store type and an option to display advertisements) may be collected in a preliminary window of a virtual reality experience and used to configure the virtual reality environment. In some embodiments, a user may choose to have a virtual shopping environment displayed in an automatic mode, in which the user may view an automatically controlled passage through the virtual environment. In some embodiments, a user may choose to have a virtual shopping environment displayed in a manual mode, in which the user may control in real-time the navigation through the virtual shopping environment. In some embodiments, a user may transition back and forth between an automatic mode and a manual mode.

Embodiments of the present disclosure may provide an array of configurations that may improve a user's virtual shopping experience by facilitating virtual navigation and improving virtual shopping efficiency.

Turning to the figures, FIG. 1 illustrates an example embodiment of a system 100 for creating a customized virtual shopping experience according to the present disclosure. System 100 may include one or more networked devices for capturing data that may be used to customize a virtual shopping environment.

The system 100 may include physical-world shopping monitors 110 that collect user physical-world shopping data as a user shops while physically present in a physical-world shopping environment. The physical-world shopping environment may be a physical brick-and-mortar store, where a user may be physically present to shop for products. Examples of such a physical-world shopping environment include a local grocery store, shopping mall, or hardware store.

The physical-world shopping monitors 110 may include devices, such as cameras, that may collect user physical-world shopping data, such as the user's path of traversal though the physical-world shopping environment, the user's speed of traversal through the physical-world shopping environment, the user's gaze direction while shopping, and the amount of time the user remains in different areas within the physical-world shopping environment while shopping. In some embodiments, the physical-world shopping monitors may include radio-frequency identification ("RFID") sensors capable of monitoring the location of products for sale in the physical-world shopping environment. For example, an RFID sensor may detect an RFID tag on a product and indicate when a user has removed the product from a store shelf and is carrying the product to other areas of the store, such as to an area where checkout counters are located. In some embodiments, the physical-world shopping monitors may include technology, such as beacon technology, capable of monitoring a user's location within the physical-world shopping environment.

System 100 may also include user wearable devices 120. Wearable devices 120 may include items such as fitness trackers with heart rate monitoring and pedometer capabilities and mobile telephones capable of detecting global position and phone orientation data. Wearable devices 120 may collect user physical-world shopping data as a user shops while physically present in a physical-world shopping environment. For example, a fitness tracker worn by a user may collect a user's heart rate as the user advances through the physical-world shopping environment, and a mobile telephone may collect the user's position as well as a direction the user is facing as the user advances through the physical-world shopping environment.

System 100 may include an IoT device 160. For example, system 100 may include a camera installed in a user's refrigerator that is capable of capturing images inside the refrigerator and transmitting image data via an internet connection. Such image data may be used for purposes such as taking an inventory of products in the refrigerator or determining a list of products for purchase, which may be displayed to a user during a virtual shopping experience.

System 100 may include a virtual reality viewing device 130 that is capable of displaying a virtual shopping environment 140 to a user and permitting the user to interact with other people, avatars, or objects within the virtual shopping environment 140. For example, virtual reality viewing device 130 may be a set of virtual reality goggles or a mobile phone mounted to a headset by which a user may view and/or listen to activity within the virtual shopping environment 140. In some embodiments, virtual reality viewing device 130 may be a monitor or viewing screen. In some embodiments, virtual reality viewing device 130 may include a controlling device, such as a keyboard, remote control, or hand-position sensor, that allows a user to input user preferences and/or virtual actions into system 100. For example, a user may use such a controlling device to direct a path of navigation or to select, inspect, manipulate, and purchase products in the virtual shopping environment.

In some embodiments, virtual shopping environment 140 may include an environment such as a digital representation of an actual physical-world shopping environment (e.g., a local furniture store or department store). In some embodiments, virtual shopping environment 140 may include a digital, generic shopping environment that may be customized according to a user's preferences. For example, virtual shopping environment 140 may be a digital retail space that only includes groceries, plumbing hardware, and men's clothing, according to a user's selections.

In some embodiments, system 100 may permit virtual reality viewing device 130 to connect with a one or more additional virtual reality viewing devices that belong to additional users. This connection may occur through network 170 or through another network. In these embodiments, system 100 may present virtual shopping environment 140 to the additional users through the additional virtual reality viewing devices as well as to the primary user through virtual reality viewing device 130. This may be beneficial, for example, when multiple individuals desire to view the same virtual shopping environment 140 together. In these embodiments, the primary user and the additional users may be at the same physical location (i.e., connected to the virtual shopping environment 140 through the same local area network) or may be at different locations (e.g., the primary user may be located in the United States, a first additional user may be located in England, and a second additional user may be located in Australia).

In some embodiments in which the virtual shopping environment may be presented to more than one user through more than one virtual reality viewing device (i.e., to a primary user and to at least one additional user), the properties of the virtual shopping environment 140 that is presented to the users may be based on data corresponding only to the primary user (e.g., the primary user's shopping data). For example, the locations of products in the virtual shopping environment 140 may be based on the shopping preferences of the primary user and may be presented to both the primary user and the additional users. In other embodiments, the properties of the virtual shopping environment 140 that is presented to the users may be based on data corresponding to both the primary user and an additional user. For example, a navigation path through the virtual shopping environment 140 may be based on the primary user's physical-world navigation routine (or routines), whereas the virtual-world navigation pace at which the users automatically navigate the virtual shopping environment 140 may be based on an additional user's physical-world navigation pace. For example, the system 100 may select a virtual-world navigation pace that corresponds to the user with the slowest physical-world navigation pace among all of the participating users. Finally, in some embodiments, the properties of the virtual shopping environment that is presented to the users may not be based on the physical-world shopping data of any of the participating users, but may be based on a real-world location.

For example, a primary user may be located in the United States and may be communicating with an additional user (e.g., a friend or relative) who is travelling or living in England. In this example, the primary user and the additional user may desire to shop together in a virtual shopping environment in an effort to be personally connected, and the additional user may be excited to show the primary user the shops at Oxford Circus in London. In this example, the virtual shopping environment 140 may be based on the real-world location of Oxford Circus, and may be presented to both the primary user through virtual reality viewing device 130 and the additional user through an additional virtual reality viewing device. Further, in this example, the primary and additional users may decide to layout the virtual shopping environment based on the additional user's recent shopping trips to the physical world Oxford Circus or subsequent virtual-reality trips to a virtual-shopping environment representation of Oxford Circus. This may be beneficial, for example, to allow the additional user to recreate a previous shopping experience for the primary user, or to allow the additional user to show the primary user around the shops that are preferred by the additional user. However, in this example, the additional user may be far more familiar with the shops at Oxford Circus than the primary user, and may therefore have developed a faster pace of navigating the shops at Oxford Circus than the primary user would be comfortable. Thus, if the primary user and the additional user decided to automatically advance through the virtual shopping environment 140, the virtual-world navigation pace of that advancement may be based on the primary user's physical-world navigation pace when that primary user is in a physical-world shopping environment for the first time.

A user's interactions within the virtual shopping environment may include activities similar to those the user would exhibit in a physical-world shopping environment. For example, a user may casually proceed through aisles of products in the virtual shopping environment and look at any items of interest. In another example, a user may virtually select, manipulate, and inspect products within the virtual shopping environment (e.g., a user may virtually pick up a can of soup from a shelf, turn the can of soup around, and read a nutrition label on the back side of the can). In another example, a user may verbally communicate with other users or avatars within the virtual shopping environment, such as to inquire about products or prices.

System 100 may collect user virtual-world shopping data regarding a user's activity in virtual shopping environment 140 via virtual reality viewing device 130, user wearable devices 120, or software executed by a processing device 150 that may digitally monitor the user's activity within virtual shopping environment 140. For example, in some embodiments, virtual reality viewing device 130 may include hardware and/or software capable of monitoring a user's gaze while the user engages with the virtual shopping environment. Such monitoring may include tracking a user's direction of gaze while the user advances through an aisle of products, or logging an amount of time a user spends looking at a product before selecting it for purchase. In some embodiments, virtual reality viewing device 130 may include a recording device capable of capturing a user's audible expressions for analysis. In some embodiments, system 100 may use a heart rate monitor worn by a user to monitor a user's heart rate as the user looks at products in the virtual shopping environment. In some embodiments, system 100 may use software executed by a processing device 150 to digitally monitor aspects such as a user's path of navigation through the virtual shopping environment, the amount of time a user spends in areas of the virtual shopping environment, and how often a user purchases particular products in the virtual shopping environment.

System 100 may include a network 170 and a storage/processing device 150. Storage/processing device 150 may include software for implementing the virtual shopping environment as well as performing functions such as storing user shopping data, configuring the virtual shopping environment, and analyzing user shopping data. In some embodiments, storage/processing device 150 may comprise multiple devices. In some embodiments, storage/processing device 150 may be a component of one or more of the IoT device(s) 160, physical-world shopping monitors 110, user wearable devices 120, and/or the virtual reality viewing device 130.

In some embodiments, the network 170 may be implemented using any number of any suitable communications media. For example, the network 170 may be a wide area network (WAN), a local area network (LAN), an internet, or an intranet. In certain embodiments, one or more of the storage/processing device(s) 150, IoT device(s) 160, physical-world shopping monitors 110, user wearable devices 120, and/or the virtual reality viewing device 130, may be local to each other, and they may communicate via any appropriate local communication medium. For example, the user wearable devices 120 and the virtual reality viewing device 130 may communicate using a local area network (LAN), one or more hardwire connections, a wireless link or router, or an intranet. In some embodiments, one or more of the storage/processing device(s) 150, IoT device(s) 160, physical-world shopping monitors 110, user wearable devices 120, and/or the virtual reality viewing device 130, may be communicatively coupled using a combination of one or more networks and/or one or more local connections. For example, the IoT device(s) 160 may communicate with the virtual reality viewing device 130 via a local area network (LAN), while the physical-world shopping monitors 110 and the storage/processing device 150 may communicate over the Internet.

In some embodiments, the network 170 can be implemented within a cloud computing environment or using one or more cloud computing services. In some embodiments, the network 170 may be substantially similar to, or the same as, network 50 described in FIG. 5 and FIG. 6. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 170.

Figure 2:
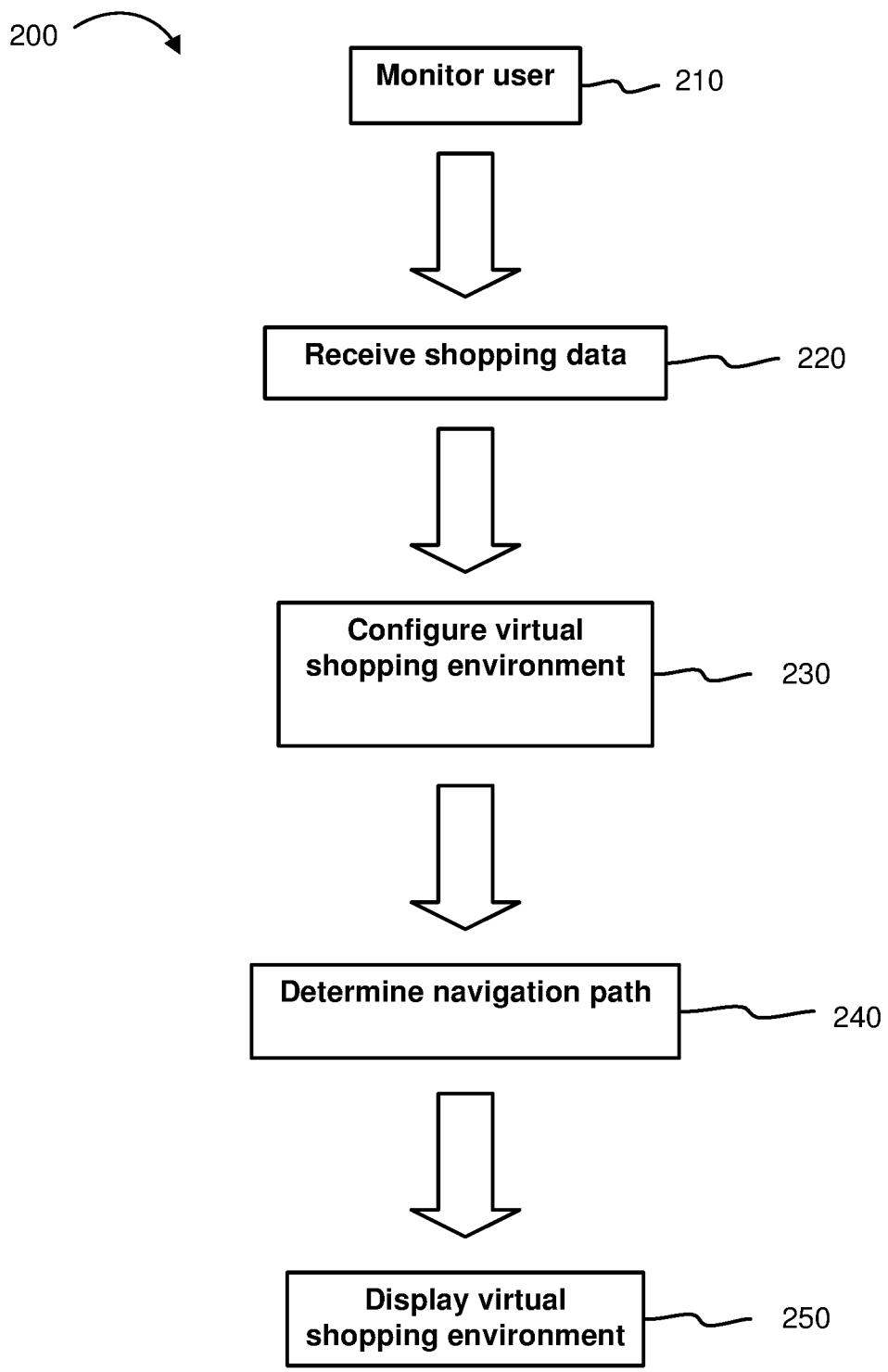
FIG. 2 depicts a flowchart of an example method for using a system, in accordance with embodiments of the present disclosure.

FIG. 2 illustrates an example method 200 of using a system according to the present disclosure. One or more operations of method 200 may be performed by a processor (e.g., processing device 150 of FIG. 1) automatically or in response to user input. At step 210, the system monitors a user who is present in a physical-world shopping environment or participating in a virtual-world shopping environment.

During such monitoring, user shopping data may be aggregated and/or analyzed. For example, in some embodiments, the system may monitor a user's shopping activity across virtual and physical-world shopping environments and aggregate the data collected. For example, in some embodiments, a user may shop in a virtual-world shopping environment on one day and then shop in a physical-world shopping environment on another day. In this example, the system may collect the user's shopping data as the user participates in the virtual-world shopping environment, collect the user's shopping data while the user is present in the physical-world shopping environment, and then combine and store the data under a user profile.

Such monitoring of the user's shopping activity across shopping environments may allow the system to collect user shopping data that accurately reflects the user's actual shopping habits. For example, a user who mostly shops in a physical-world shopping environment may exhibit different shopping behavior during a physical-world shopping experience than during a virtual shopping experience (e.g., the user may spend more time browsing products, advance through aisles of products at a slower pace, or be more likely to make purchases). By collecting more accurate user shopping data, the system may configure a virtual shopping environment better suited to the user's shopping preferences (e.g. the system may configure an environment in which products are arranged for convenient browsing; the system may establish a default virtual-world navigation pace that mimics the user's physical-world navigation pace; or the system may offer discounts to incentivize the user to make more purchases in the virtual shopping environment).

At step 220 a processor may receive user shopping data. In some embodiments, the shopping data may be received from a storage device, such as a server. In some embodiments, the shopping data may be received directly from a device with data collection functionality, such as a user wearable device, IoT device, or a virtual reality viewing device.

For example, in some embodiments, a processor may obtain, via an internet connection, digital information regarding a layout of a physical-world store from a remote server. In another example, during a physical-world shopping experience, a user's wearable device, such as a smart watch, may transmit the user's navigation path and heart rate to a processor via a wireless mobile network connection. In an additional example, during a virtual-world shopping experience, a hand-position sensor included with a virtual reality viewing device may transmit the user's hand movements to a processor via a wired connection to indicate an item selection in the virtual world.

At step 230 a processor may configure a virtual shopping environment. In some embodiments, the virtual shopping environment may be configured based on inputs such as user-selected preferences, archived user-shopping data, and/or a device with data collection functionality. In some embodiments, configuring a virtual shopping environment may include a step such as determining a type of shopping environment that will be displayed (e.g., determining that a digital replication of an actual physical-world furniture store will be displayed, rather than a generic digital shopping space having only user-selected categories of products). In some embodiments, configuring a virtual shopping environment may include a step such as including advertisements for certain products in the virtual shopping environment based on archived user shopping data that indicates a user may be responsive to such advertisements. In some embodiments, configuring a virtual shopping environment may include a step such as removing a particular brand of products from the virtual shopping environment based on a user verbally expressing dissatisfaction with the particular brand of products while participating in the virtual shopping environment. In some embodiments, configuring a virtual shopping environment may include a step such as displaying to the user an option to purchase a product, such as milk, based on an image from the user's IoT refrigerator camera indicating that there is no milk in the user's refrigerator.

Configuring a virtual shopping environment may include utilizing user shopping data corresponding to a user's previous physical-world shopping activity and/or a user's previous virtual-world shopping activity, and/or a user's present virtual-world shopping activity.

At step 240, a processor may determine a user's navigation path through the virtual shopping environment. Step 240 may also include selecting a pace by which the user may advance through the virtual shopping environment and/or setting a user's viewing perspective for navigating the virtual shopping environment.

In some embodiments, determining a user's navigation path through the virtual shopping environment may be based on archived user shopping data corresponding to an order in which the user searches for products in a physical-world shopping environment. For example, in some embodiments, a processor may set a virtual-world navigation path to start in a cleaning products section, then progress to an electronic products section, and then progress to a grocery section, if archived physical-world shopping data indicated that was a user's most frequent shopping routine in a physical-world store that was similar to the virtual shopping environment.

In some embodiments, selecting a pace by which a user may advance through the virtual shopping environment may be based on a user preference. For example, software executed by a processing device may provide a preferences window at the onset of a virtual shopping experience, whereby a user may select a navigation pace from a list of available navigation paces.

In some embodiments, determining a navigation path may include a step such as establishing a viewing perspective for navigating the virtual shopping environment, based on archived data corresponding to the user's typical gaze direction while shopping in a physical-world shopping environment. For example, if a user tends to browse aisles of a physical-world shopping environment by facing one row of shelves at a time, the viewing perspective for navigating the virtual shopping environment may include displaying one row of shelves, as opposed to two rows of shelves on either side of the user.

At step 250, a processor may display the virtual shopping environment to one or more users via a display device, such as a virtual reality viewing device. The virtual shopping environment may be displayed in an automatic mode or a manual mode.

In automatic mode, the user is automatically advanced through the virtual shopping environment without any navigation control by the user. For example, in some embodiments, a display in automatic mode may include a virtual reality viewing device displaying the shopping environment as though the user were walking through the shopping environment in a manner that mimics the user's customary shopping behavior. For example, a pace of automatic advancement through the virtual shopping environment in automatic mode may be determined based on an average of the user's previous walking paces through a physical-world grocery store. In another example, a viewing perspective displayed in automatic mode may oscillate between facing left-side shelves of an aisle and facing right-side shelves of an aisle of the virtual shopping environment to mimic the user's most frequent browsing movements in previous virtual shopping experiences. In another example, a virtual-world navigation path displayed in automatic mode may be a serpentine path through adjacent aisles of the virtual shopping environment, based on previously collected user shopping data that indicates the user typically follows such a serpentine navigation routine when the user shops in both virtual and physical-world shopping environments.

In some embodiments, a user may simply observe a virtual shopping environment in automatic mode to browse available products. For example, a user may want to virtually browse home furniture products available at several local furniture stores with no specific product in mind. In this example, the user could virtually walk through each of the furniture stores to compare their selections of products, and then return to a store having the most preferred selection of products.

Also at step 250, a processor may display the virtual shopping environment in manual mode. In manual mode, the user may control one or more parameters of the virtual shopping experience in real-time. For example, in some embodiments, the user may manually select and vary a pace of advancement, viewing perspective, and navigation path through the virtual shopping environment in real-time, according to the user's preference. In manual mode, the user may freely control one or more parameters of the virtual shopping environment in a manner similar to the manner the user may freely control his or her actions in a physical-world shopping environment.

In some embodiments, a user may transition between an automatic mode and a manual mode display of the virtual shopping environment. For example, in some embodiments, a user may begin a virtual shopping experience in automatic mode (e.g., to generally explore available sale products) and then transition to manual mode (e.g. to more closely inspect one or more specific products). In some embodiments, a user may begin a virtual shopping experience in manual mode (e.g. to purchase a specific item in a specific department of a virtual shopping environment) and then transition to automatic mode (e.g. to browse products in other departments of the virtual shopping environment).

In some embodiments, the user may initiate such a transition by issuing a command to a processor to change the display mode. In some embodiments, in response to receiving the command, the processor may cease automatically advancing the user in an automatic mode display and permit the user to control one or more parameters of the virtual shopping experience in real-time in a manual mode display. In some embodiments, in response to receiving a command from the user, the processor may cease a manual mode display and begin automatically advancing the user in an automatic mode display.

The ability to transition between an automatic mode and a manual mode may allow a user to efficiently locate, inspect, and browse products in a manner that reflects his or her typical shopping style.

Figure 3:
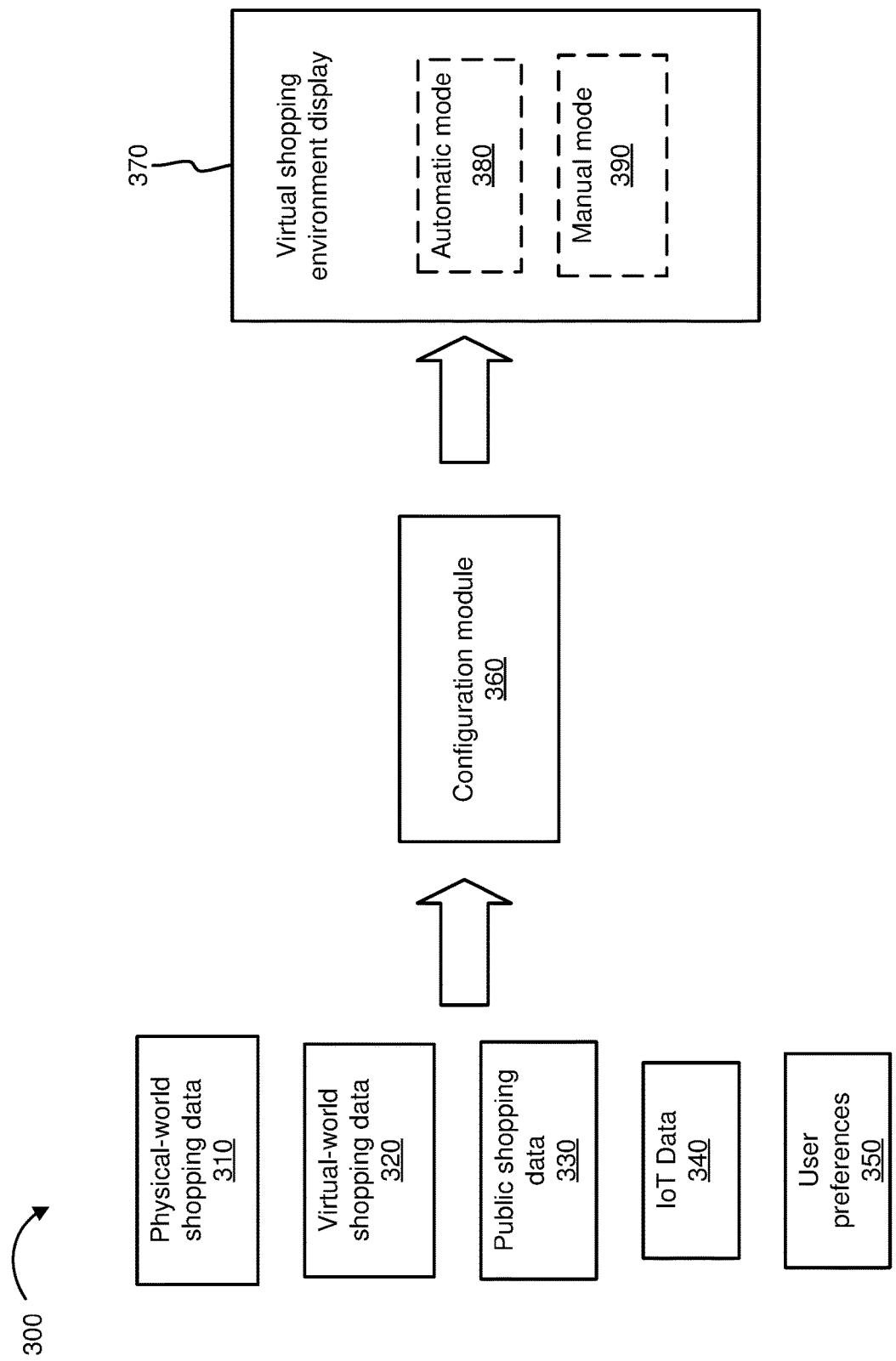
FIG. 3 depicts an example system block diagram, in accordance with embodiments of the present disclosure.

FIG. 3 illustrates a block diagram of an example system 300 according to the present disclosure. System 300 includes a configuration module 360 that is operable to configure a virtual shopping environment based on data inputs. The configuration module 360 may be a processor or a component of a processor (e.g., processing device 150 of FIG. 1).

The configuration module may determine parameters of the virtual shopping environment, such as a navigation path, a pace of navigation, and a viewing perspective. The configuration module may determine such parameters based on inputs such as physical-world shopping data 310, virtual-world shopping data 320, public shopping data 330, IoT data 340, and/or user preferences 350.

In some embodiments, physical-world shopping data 310 may include data collected by physical-world shopping monitors or user wearable devices. For example, in some embodiments, physical-world shopping data 310 may include orientation information from an accelerometer of a user's smartphone that indicates what direction a user is facing in the physical-world shopping environment. Such orientation information may be used to determine information such as whether a user is browsing a category of products on a left-side shelf or a different category of products on a right-side shelf. In some embodiments, physical-world shopping data may include location information monitored by global positioning software on a user's smartphone and/or beacon technology installed in the physical-world shopping environment. Such location information may be used to determine frequently visited departments in the physical-world shopping environment.

In some embodiments, virtual-world shopping data 320 may include data collected by a virtual reality viewing device, a user wearable device, or software executed by a processing device for monitoring a user's virtual shopping activity. For example, in some embodiments, a user wearable device may collect a user's heart rate as the user advances through the virtual-world shopping environment. The heart rate information may be used to predict, via a processor configured with machine learning technology, information such as which products a user may purchase in the virtual shopping environment or which features of a virtual shopping environment may detract from a relaxing virtual shopping experience for the user. For example, in some embodiments, a processor may associate, via an algorithm or via machine learning technology, a monitored transition from a lower heart rate, such as 60 beats per minute ("bpm"), to a higher heart rate, such as 80 bpm, over a time period, such as 5 minutes, with a likelihood that a user will purchase a product that the user is inspecting. Based on the association, the processor may predict that a user will purchase the product if the user is incentivized with an advertisement; thus, in response to the prediction, the processor may display an advertisement to the user.

In some embodiments, virtual-world shopping data may include audio recordings of a user captured by a pair of virtual reality goggles configured for recording verbal expressions. For example, a user wearing such virtual reality goggles may verbally express an opinion, such as "this is a great product," about a product observed in the virtual shopping environment. Such an expression may be analyzed by a processor and used to configure a virtual shopping environment, such as to determine whether to include an advertisement or to determine a position of a product in the virtual shopping environment (e.g., a user's most highly preferred product is vertically centered on a virtual shelf in the virtual shopping environment for convenient visibility).

In some embodiments, public shopping data 330 may include available shopping data that corresponds to shopping activity of the shopping public. For example, public shopping data may include a list of popular children's toys or a list of stereo systems that were highly rated by other shoppers. Such public shopping data may allow a user to tailor one or more parameters of a virtual shopping environment, such as a virtual-world navigation path through the virtual shopping environment.

For example, a user unfamiliar with children's products may desire to find a gift for a child in a virtual bookstore. The user may direct the configuration module 360 to generate a navigation path through the virtual bookstore that has stopping points where the most popular children's gifts, based on public shopping data, are located. In this example, the user may browse products in the bookstore while being directed toward the most popular products. Accordingly, the user may efficiently browse products in a virtual shopping environment with little or no prior knowledge about the products.

In some embodiments, IoT data 340 may include a device such as a camera installed inside a user's refrigerator. IoT data from such a camera may allow a user to check for needed grocery items during a virtual shopping experience. For example, during a virtual shopping experience, a user may instruct a configuration module to display images inside the user's refrigerator, so the user can determine which items need to be purchased.

In some embodiments, user preferences 350 may include information supplied by a user to establish one or more parameters of a virtual shopping environment. For example, user preferences may include information such as user-selected categories of products to display in a virtual shopping environment, a user-selected mode of navigation (e.g. automatic mode 380 or manual mode 390), or a user-selected navigation path, pace, or viewing perspective within the virtual shopping environment.

Configuration module 360 communicates with a virtual shopping environment display 370, such as a viewing screen of virtual reality goggles, which may display the virtual shopping environment to one or more users in an automatic mode 380 or manual mode 390.

In some embodiments, more than one user may simultaneously participate in the same virtual shopping environment. For example, in some embodiments, a first user and a second user may observe the first user's navigation perspective in a virtual environment. In some embodiments, a first user and a second user may observe separate and independent navigation perspectives within the same virtual shopping environment. In some embodiments, first and second users simultaneously participating in the same virtual shopping environment may communicate with each other and view avatars of one another in the virtual shopping environment. Accordingly, embodiments of the present disclosure may provide a collaborative virtual shopping experience between multiple users.

Figure 4:
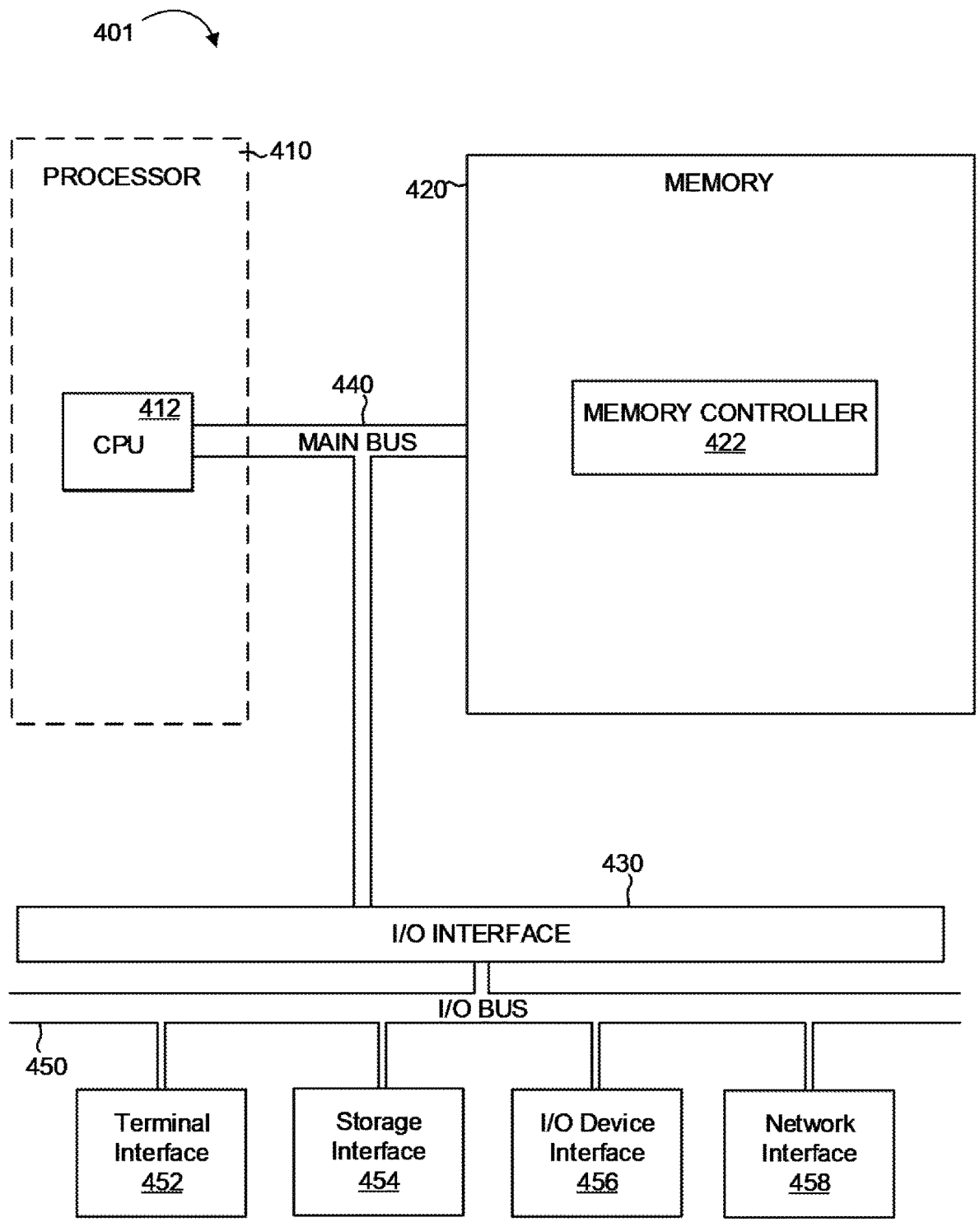
FIG. 4 depicts the representative major components of a computer system that may be used in accordance with embodiments of the present disclosure.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
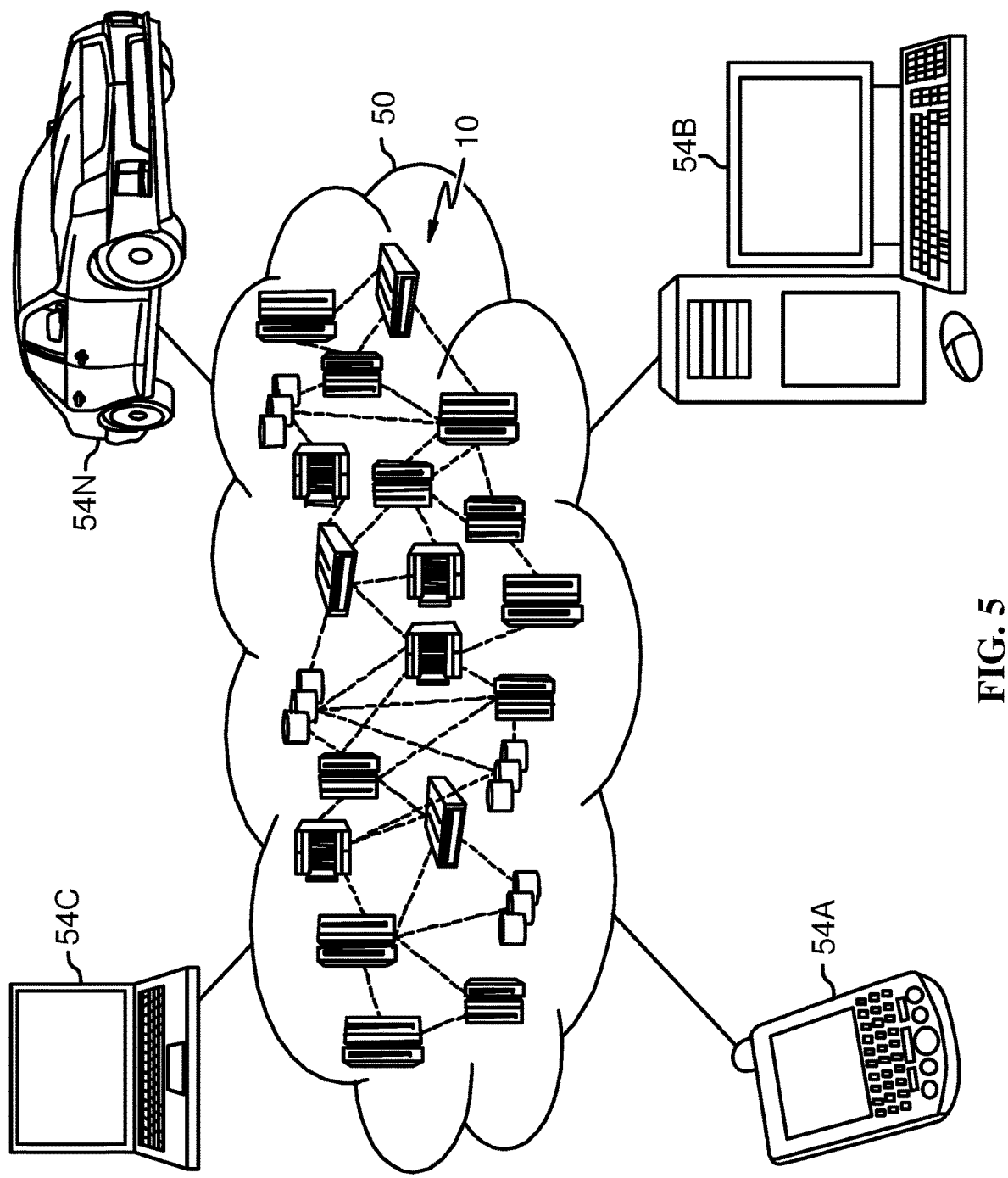
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
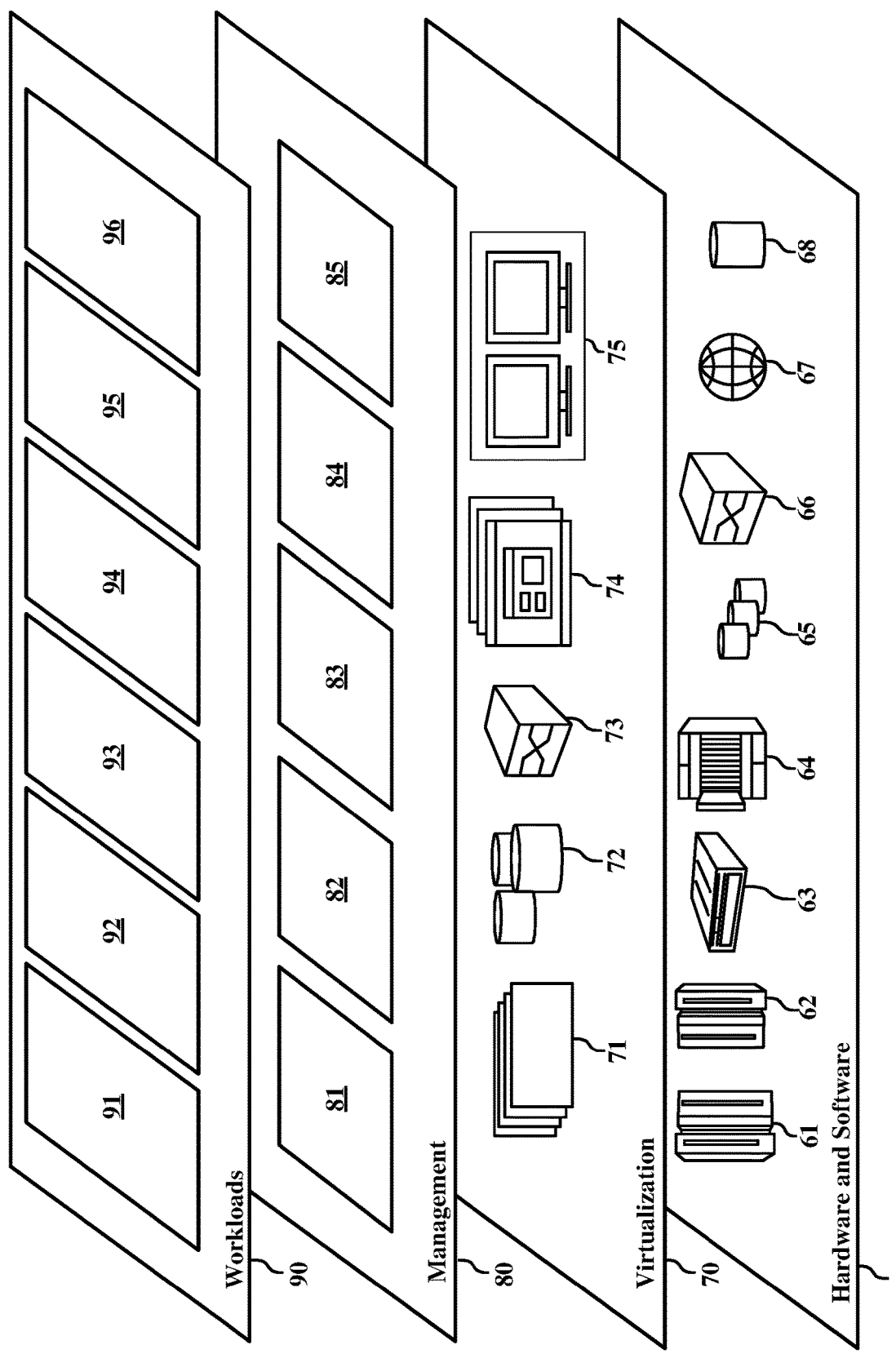
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual reality logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, performed by one or more processors, comprising:
   receiving physical-world shopping data of a first user,
      wherein the physical-world shopping data is collected while the first user is physically present in a physical-world shopping environment, and
      wherein the physical-world shopping data comprises:
         a physical-world navigation pace, and
         a physical-world navigation routine comprising a sequence of shopping departments visited by the first user in the physical-world shopping environment;
   configuring a virtual shopping environment based at least in part on the physical-world shopping data;
   displaying to the first user the virtual shopping environment,
      wherein the displaying includes automatically advancing the first user along a virtual-world navigation path of the virtual shopping environment, the virtual-world navigation path based on the physical-world navigation routine, and
      wherein the automatically advancing the first user comprises advancing the first user at a virtual-world navigation pace that is based on the physical-world navigation pace;
   monitoring the first user's heart rate with a heart rate monitor;
   associating a characteristic of the first user's heart rate with a likelihood that the first user will purchase a product;
   predicting, based on the associating, that the first user will purchase a product in the virtual shopping environment; and
   in response to the predicting, displaying an advertisement to the first user.

2. The method of claim 1, wherein the configuring further comprises analyzing a recorded statement of the first user, and based on the analyzing, determining a position of a product in the virtual shopping environment.

3. The method of claim 1, wherein the configuring further comprises generating the virtual-world navigation path based on public shopping data comprising a set of product ratings.

4. The method of claim 1, wherein the configuring further comprises including an advertisement in the virtual shopping environment based on archived shopping data of the first user.

5. The method of claim 1, further comprising monitoring the first user's virtual-world shopping activity, and wherein the configuring is based in part on the first user's virtual-world shopping activity.

6. The method of claim 1, further comprising displaying the virtual shopping environment to an additional user.

7. A computer program product, the computer program product comprising a computer readable storage medium having program instructions embodied therewith, the program instructions executable by a computer to cause the computer to:
- receive physical-world shopping data of a first user,
  - wherein the physical-world shopping data is collected while the first user is physically present in a physical-world shopping environment, and
  - wherein the physical-world shopping data comprises:
    - a physical-world navigation pace, and
    - a physical-world navigation routine comprising a sequence of shopping departments visited by the first user in the physical-world shopping environment;
- configure a virtual shopping environment based at least in part on the physical-world shopping data;
- display to the first user the virtual shopping environment,
  - wherein the program instructions to display include instructions to automatically advance the first user along a virtual-world navigation path of the virtual shopping environment, the virtual-world navigation path based on the physical-world navigation routine, and
  - wherein the instructions to automatically advance the first user comprise instructions to advance the first user at a virtual-world navigation pace that is based on the physical-world navigation pace;
- monitor the first user's heart rate with a heart rate monitor;
- associate a characteristic of the first user's heart rate with a likelihood that the first user will purchase a product;
- predict, based on the associating, that the first user will purchase a product in the virtual shopping environment; and
- display, in response to the predicting, an advertisement to the first user.

8. The computer program product of claim 7, wherein the instructions to configure further comprise instructions to analyze a recorded statement of the first user, and based on the analyzing, determine a position of a product in the virtual shopping environment.

9. The computer program product of claim 7, wherein the instructions to configure further comprise instructions to generate the virtual-world navigation path based on public shopping data comprising a set of product ratings.

* * * * *